(12) United States Patent
Cao et al.

(10) Patent No.: US 11,548,422 B2
(45) Date of Patent: Jan. 10, 2023

(54) SELF-RESET ADJUSTING MECHANISM

(71) Applicant: Yanfeng Adient Seating Co. Ltd., Shanghai (CN)

(72) Inventors: Yaowei Cao, Shanghai (CN); Donghai Xu, Shanghai (CN); Xia Li, Shanghai (CN); Min Zhu, Shanghai (CN)

(73) Assignee: YANFENG ADIENT SEATING CO. LTD., Shanghai (CN)

( * ) Notice: Subject to any disclaimer, the term of this patent is extended or adjusted under 35 U.S.C. 154(b) by 0 days.

(21) Appl. No.: 16/959,935

(22) PCT Filed: Aug. 3, 2018

(86) PCT No.: PCT/CN2018/098465
§ 371 (c)(1),
(2) Date: Jul. 2, 2020

(87) PCT Pub. No.: WO2019/179000
PCT Pub. Date: Sep. 26, 2019

(65) Prior Publication Data
US 2021/0016697 A1 Jan. 21, 2021

(30) Foreign Application Priority Data

Mar. 19, 2018 (CN) .......................... 201810224412.1

(51) Int. Cl.
*B60N 2/844* (2018.01)
*B60N 2/847* (2018.01)

(52) U.S. Cl.
CPC .............. *B60N 2/844* (2018.02); *B60N 2/847* (2018.02)

(58) Field of Classification Search
CPC ................................ B60N 2/847; B60N 2/844
See application file for complete search history.

(56) References Cited

U.S. PATENT DOCUMENTS 8,641,149 B2 * 2/2014 Little ..................... B60N 2/847
297/408
9,132,756 B1 * 9/2015 Witte ..................... B60N 2/844
(Continued)

FOREIGN PATENT DOCUMENTS

CN 201798309 U 4/2011
CN 203255001 U 10/2013
(Continued)

OTHER PUBLICATIONS

International Search Report cited in corresponding PCT application No. PCT/CN2018/098465; dated Oct. 18, 2018; 6 pp.
(Continued)

*Primary Examiner* — David R Dunn
*Assistant Examiner* — Tania Abraham
(74) *Attorney, Agent, or Firm* — Lempia Summerfield Katz LLC

(57) ABSTRACT

The invention relates to a self-reset adjusting mechanism, including: a mounting base; an adjusting member rotatably mounted on the mounting base; a first reset member mounted between the adjusting member and the mounting base; a limiting member rotatably mounted on the mounting base, the limiting member being provided with, corresponding to the adjusting member, a plurality of clamping tables at different heights, and the position of the adjusting member being adjusted by clamping the adjusting member on the clamping tables corresponding to the limiting member; and a second reset member mounted between the limiting member and the mounting base, when the limiting member is rotated to the limit position, the second reset member being deformed to produce an acting force in a direction the same as the rotation direction of the limiting member to cause the limiting member to be in the limit position, and in this case, the first reset member resetting the adjusting member and exerting a reset acting force on the limiting member, so that the second reset member is restored and the limiting member is reset. The self-reset adjusting mechanism of the invention simplifies a core mechanism of a headrest while ensuring the strength of the headrest, has a simple structure, occupies a small space, and has a large adjustment range and a high impact resistance strength.

14 Claims, 13 Drawing Sheets

(56) References Cited

U.S. PATENT DOCUMENTS

2011/0221250 A1    9/2011  Little
2015/0375649 A1*  12/2015  Jeong ..................... A47C 7/38
                                                          297/391

FOREIGN PATENT DOCUMENTS

| CN | 104369682 A  | 2/2015  |
|----|--------------|---------|
| CN | 106828231 A  | 6/2017  |
| CN | 107444207 A  | 12/2017 |
| CN | 108275043 A  | 7/2018  |
| FR | 2986475 B1   | 2/2014  |
| JP | S57133338 U  | 8/1982  |
| JP | 2006523497 A | 10/2006 |
| JP | 2017105288 A | 6/2017  |
| KR | 20070107247 A| 11/2007 |
| KR | 20090111239 A| 10/2009 |
| KR | 100945574 B1 | 3/2010  |
| WO | 2015088177 A1| 6/2015  |

OTHER PUBLICATIONS

European Search Report cited in European application No. EP18910277.5; dated Jul. 13, 2021; 10 pp.
Japanese Office Action cited in Japanese app. No. 2020-535137; dated Aug. 10, 2021; 6 pp.
Notice of Allowance cited in Japanese app No. 2020-535137; dated Sep. 14, 2021; 3 pp.
Written Opinion cited in corresponding PCT application No. PCT/CN2018/098465; dated Oct. 18, 2018; 9 pp.

\* cited by examiner

SELF-RESET ADJUSTING MECHANISM

CROSS-REFERENCE TO RELATED APPLICATIONS

This application is a U.S. national stage of International Application No. PCT/CN2018/098465, filed on Aug. 3, 2018, which claims priority to Chinese Patent Application No. 201810224412.1 filed on Mar. 19, 2018, the entire disclosures and contents of which are incorporated by reference herein in their entirety.

BACKGROUND

Technical Field

The invention relates to the field of automobile seat structures, and particularly to a self-reset adjusting mechanism.

Related Art

An automobile front seat is generally provided with a headrest for a more comfortable ride. The headrest is adjustable in structure to accommodate passengers of different heights. Existing adjustable headrests on the market have a complex design structure and are costly. Moreover, the mechanism needs to be unlocked through a button. The unlocking through a button is a set of complex force transmission process, during which the force is damaged greatly and the unlocking force is difficult to control.

SUMMARY

An objective of the invention is to provide a self-reset adjusting mechanism to solve the problems of the complex structure and high costs of the existing adjustable headrests and complex force transmission, great damage, and difficult control during the unlocking through a button, so as to overcome the defects of the prior art.

A technical solution for achieving the above objective is as follows:

A self-reset adjusting mechanism is provided in the invention, including:

a mounting base;

an adjusting member rotatably mounted on the mounting base;

a first reset member mounted between the adjusting member and the mounting base, the first reset member producing, during rotation of the adjusting member, an acting force in a direction opposite to a rotation direction of the adjusting member to reset the adjusting member;

a limiting member rotatably mounted on the mounting base, one side of the limiting member corresponding to the adjusting member being provided with a plurality of clamping tables at different heights and for limiting the adjusting member, the position of the adjusting member being adjusted by clamping the adjusting member on the clamping tables corresponding to the limiting member, and when the adjusting member is rotated, the limiting member being driven to rotate together through the clamping tables; and a second reset member mounted between the limiting member and the mounting base, the second reset member producing, during rotation of the limiting member, an acting force in a direction opposite to a rotation direction of the limiting member to reset the limiting member, when the limiting member is rotated to the limit position, the second reset member being deformed to produce an acting force in a direction the same as the rotation direction of the limiting member to cause the limiting member to be in the limit position, and in this case, the adjusting member being reset under the acting force of the first reset member to exert a reset acting force on the limiting member, so that the second reset member is restored and the limiting member is reset.

The self-reset adjusting mechanism of the invention simplifies a core mechanism of a headrest while ensuring the strength of the headrest, has a simple structure, occupies a small space, is easy to assemble, and has a large adjustment range and a high impact resistance strength. Automatic unlocking is used in the self-reset adjusting mechanism of the invention, which can save the cost, and the unlocking process is simple and controllable.

A further improvement to the self-reset adjusting mechanism of the invention lies in that the limiting member is provided with a flange on the lowest clamping table; and when the limiting member is in the limit position, the adjusting member exerts the reset acting force on the limiting member by abutting against the flange during the resetting, thus completing the resetting of the adjusting member and the limiting member.

A further improvement to the self-reset adjusting mechanism of the invention lies in that the adjusting member is rotatably mounted on the mounting base through a first rotary shaft; and one side of the limiting member close to the first rotary shaft is provided with an abutting surface, and when the limiting member is rotated to the abutting surface to abut against the first rotary shaft, the limiting member is in the limit position.

A further improvement to the self-reset adjusting mechanism of the invention lies in that the first reset member is a torsion spring, one end of the torsion spring is fixed to the adjusting member, and the other end is fixed to the mounting base.

A further improvement to the self-reset adjusting mechanism of the invention lies in that the second reset member is a special-shaped torsion spring, and includes a first connection segment, an arc segment connected to the first connection segment, and a second connection segment connected to the arc segment, the first connection segment and the second connection segment are located on two sides of the arc segment and are disposed in parallel with each other, and the arc segment is arc-shaped; and the first connection segment is fixed to the limiting member, and the second connection segment is fixed to the mounting base.

A further improvement to the self-reset adjusting mechanism of the invention lies in that the limiting member is provided with a special-shaped opening;

the adjusting member is provided with a positioning convex strip running through the special-shaped opening; and when the adjusting member is clamped to the highest clamping table on the limiting member, the positioning convex strip is fitted to an inner wall of the special-shaped opening to limit the rotation of the adjusting member.

A further improvement to the self-reset adjusting mechanism of the invention lies in that the mounting base comprises a bottom plate; and one side of the limiting member close to the bottom plate is provided with a fitting surface fitted to the bottom plate.

A further improvement to the self-reset adjusting mechanism of the invention lies in that a clamping surface for clamping to the corresponding clamping table is formed at the bottom of the adjusting member.

A further improvement to the self-reset adjusting mechanism of the invention lies in that one end of the adjusting member away from the mounting base is provided with a connection shaft, and two end portions of the connection shaft each are connected to a lug plate.

A further improvement to the self-reset adjusting mechanism of the invention lies in further including a transmission member disposed between the two lug plates and disposed opposite to the adjusting member, the top of the transmission member is fixedly connected to the two lug plates, the bottom is rotatably mounted on the mounting base, and the adjusting member is driven to rotate through the transmission member.

The invention is applicable to headrests, armrests, leg supports, and pedals in the field of automobiles.

DETAILED DESCRIPTION

The invention is further described below with reference to the accompanying drawings and specific embodiments.

Figure 1:
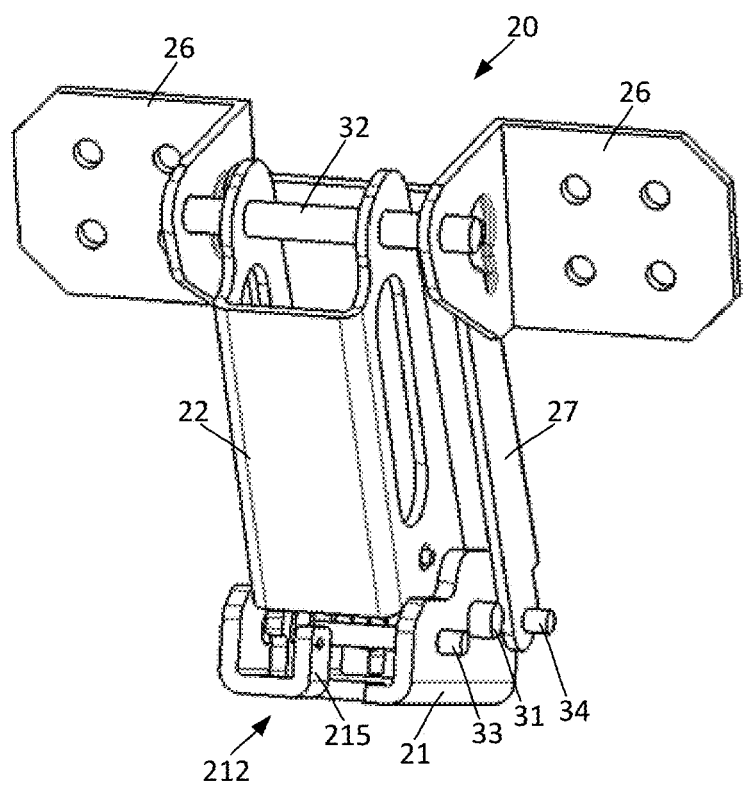
FIG. 1 is a schematic structural view of a self-reset adjusting mechanism according to the invention.

Referring to FIG. 1, a self-reset adjusting mechanism is provided in the invention, which is a core mechanism simplifying a headrest while ensuring the strength of the headrest, the self-reset adjusting mechanism is applied to automobile seat headrests, can adjust and automatically reset the headrests, is easy to operate, occupies a small space, is easy to assemble, has a large adjustment range, and is an economical headrest core member with a high impact resistance strength. The self-reset adjusting mechanism of the invention is applied to, but not limited to, headrests, and is also applicable to adjustable parts, such as armrests, foot supports, and pedals in the field of automobiles. In the self-reset adjusting mechanism of the invention, the conventional headrest core support made of a plastic material is replaced with a support made of a metal material, so that the self-reset adjusting mechanism is simple and compact in structure, meets strength requirements, is lightweight, and saves materials and costs. In the invention, automatic unlocking is adopted to achieve the purpose of cost saving and maintain the integrity of the appearance, making it simple, beautiful, and efficient and controllable. The self-reset adjusting mechanism of the invention is described below with reference to the accompanying drawings.

Figure 2:
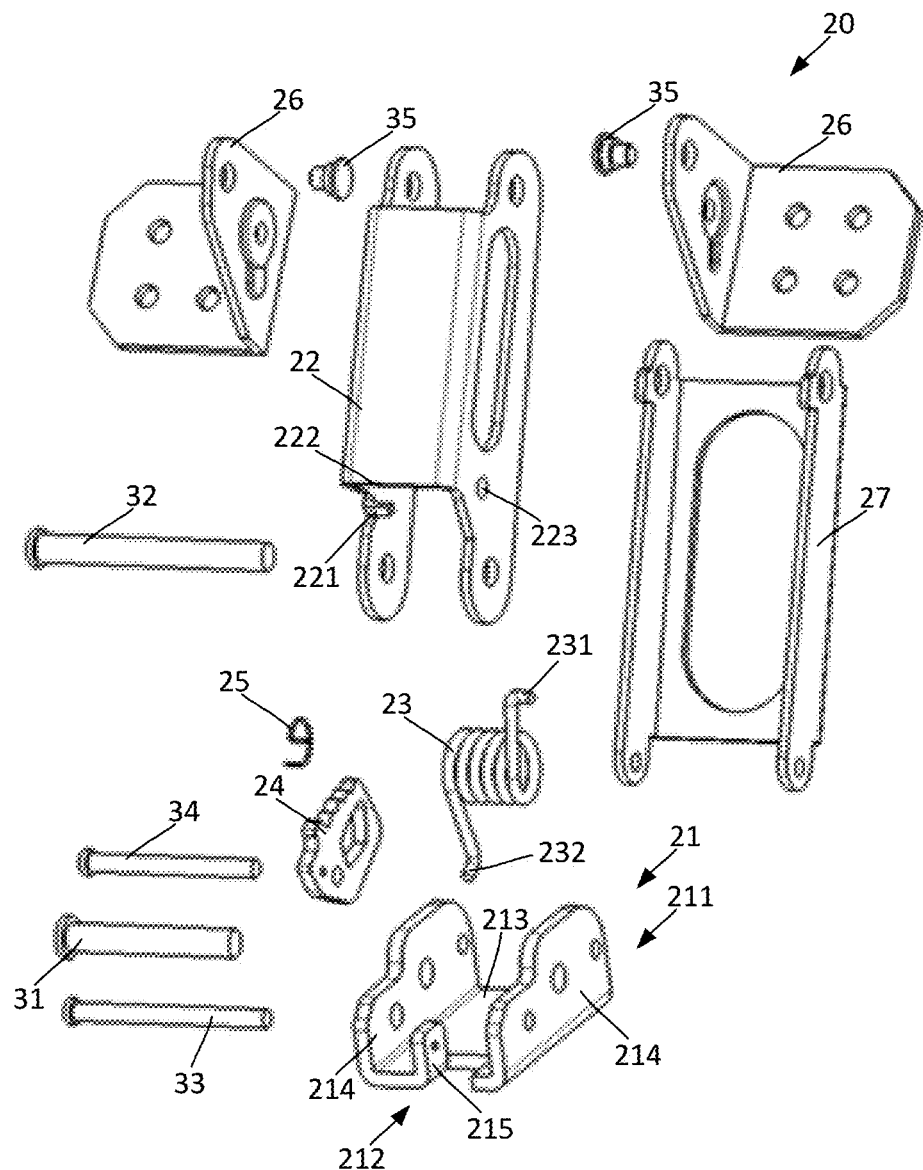
FIG. 2 is a schematic exploded structural view of the structure shown in FIG. 1.

Refer to FIG. 1 which is a schematic structural view of a self-reset adjusting mechanism according to the invention. Refer to FIG. 2 which is a schematic exploded structural view of the structure shown in FIG. 1. The self-reset adjusting mechanism of the invention is described below with reference to FIG. 1 and FIG. 2.

Figure 5:
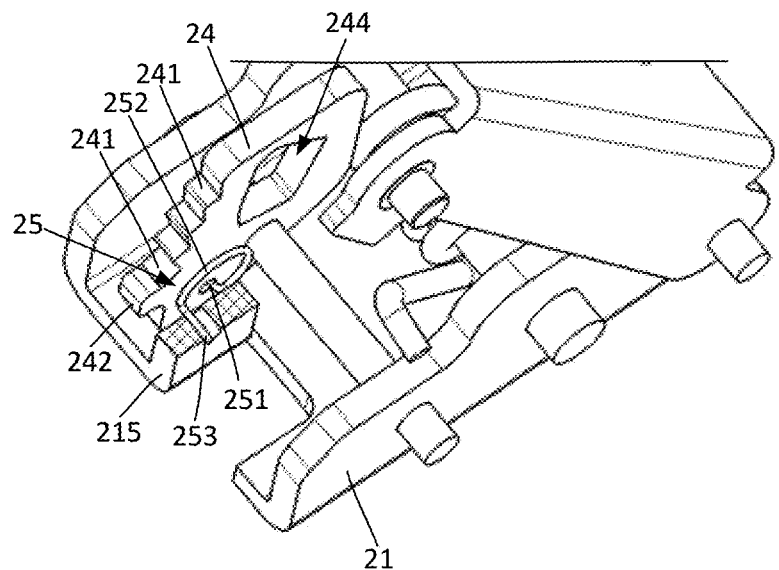
FIG. 5 is a schematic structural view showing that a second reset member is exposed after an adjusting member is omitted in the self-reset adjusting mechanism according to the invention.

As shown in FIG. 1 and FIG. 2, the self-reset adjusting mechanism 20 of the invention includes a mounting base 21, an adjusting member 22, a first reset member 23, a limiting member 24, and a second reset member 25. The mounting base 21 provides a mounting foundation for each component. The adjusting member 22 is rotatably mounted on the mounting base 21. The first reset member 23 is mounted between the adjusting member 22 and the mounting base 21. The first reset member 23 produces, during rotation of the adjusting member 22, an acting force in a direction opposite to a rotation direction of the adjusting member 22 to reset the adjusting member 22. The limiting member 24 is rotatably mounted on the mounting base 21. Referring to FIG. 5, one side of the limiting member 24 corresponding to the adjusting member 22 is provided with a plurality of clamping tables 241 at different heights and for limiting the adjusting member 22, the position of the adjusting member 22 is adjusted by clamping the adjusting member 22 on the clamping tables 241 corresponding to the limiting member 24, and when the adjusting member 22 is rotated, the limiting member 24 driven to rotate together through the plurality of clamping tables 241 at different heights. The second reset member 25 is mounted between the limiting member 24 and the mounting base 21. The second reset member 25 produces, during rotation of the limiting member 24, an acting force in a direction opposite to a rotation direction of the limiting member 24 to reset the limiting member 24. When the limiting member 24 is rotated to the limit position, the second reset member 25 is deformed to produce an acting force in a direction the same as the rotation direction of the limiting member 24 to cause the limiting member 24 to be in the limit position, and in this case, the adjusting member 22 is reset under the acting force of the first reset member 23 to exert a reset acting force on the limiting member 24, so that the second reset member 25 is restored and the limiting member 24 is reset.

Figure 3:
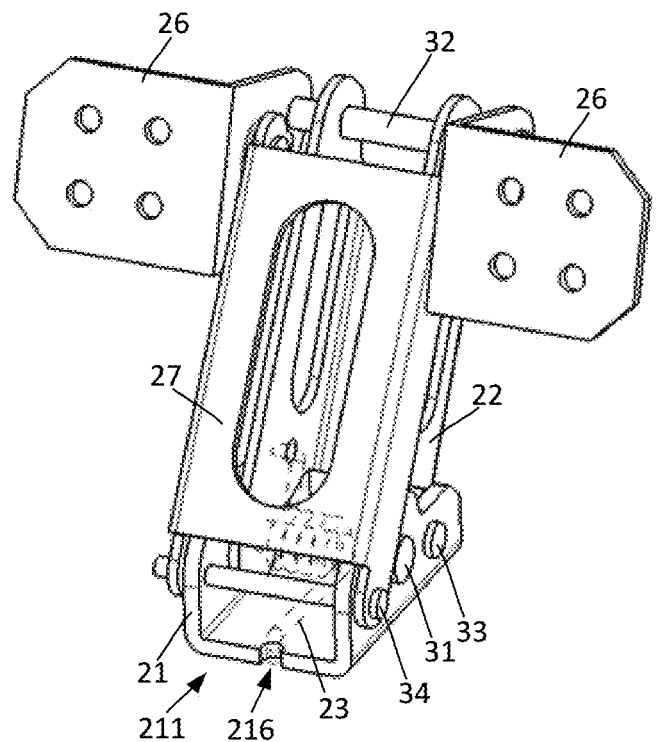
FIG. 3 is a schematic structural view of the other side of the self-reset adjusting mechanism according to the invention.

Specifically, as shown in FIG. 1 and FIG. 3, the self-reset adjusting mechanism 20 of the invention is mounted on an automobile seat headrest. The adjusting member 22 is fixedly connected to the headrest, the mounting base 21 is connected to an automobile seat, and the position of the headrest is adjusted through rotation of the adjusting member 22. The mounting base 21 includes a front side 211 and a rear side 212. A rotation adjustment direction of the adjusting member 22 is from the rear side 212 to the front side 211, and a reset direction is from the front side 211 to the rear side 212.

Figure 6:
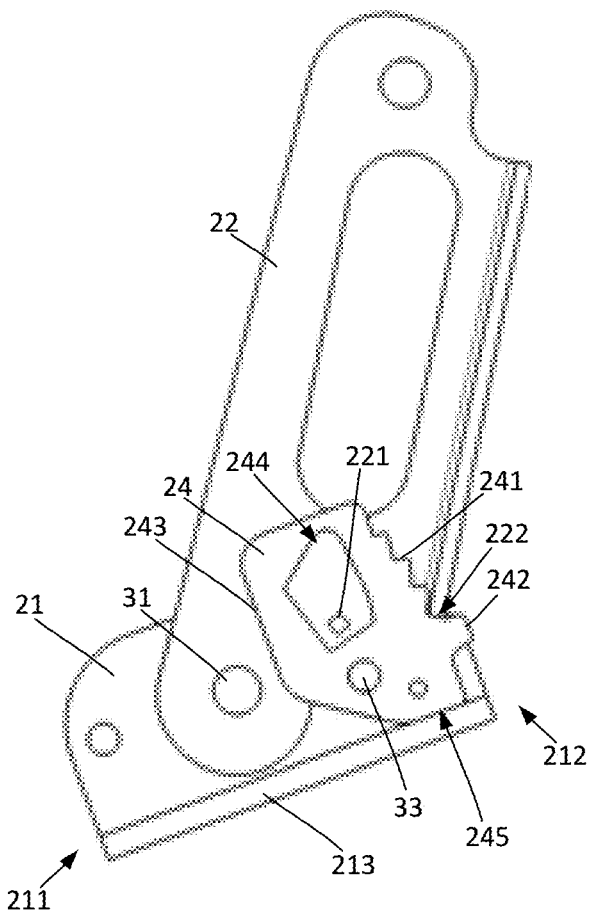
FIG. 6 is a schematic structural view of a clamping table when the self-reset adjusting mechanism according to the invention is in the lowest position.
Figure 8:
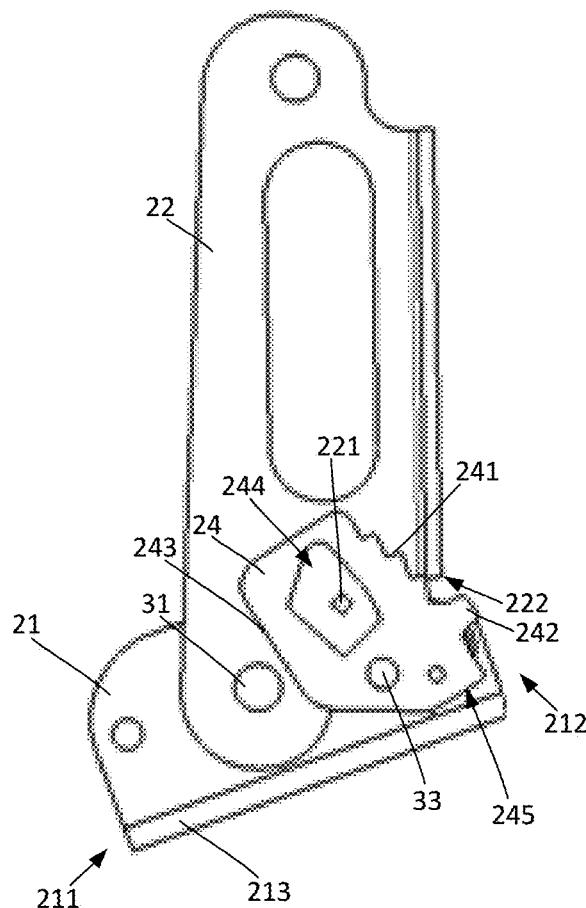
FIG. 8 is a schematic structural view of an adjusting process of the self-reset adjusting mechanism according to the invention.
Figure 9:
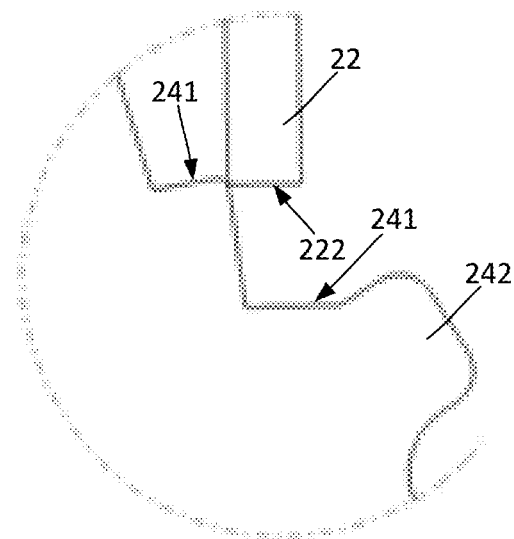
FIG. 9 is a partially enlarged schematic view of a junction between an adjusting member and a limiting member in the state shown in FIG. 8.
Figure 11:
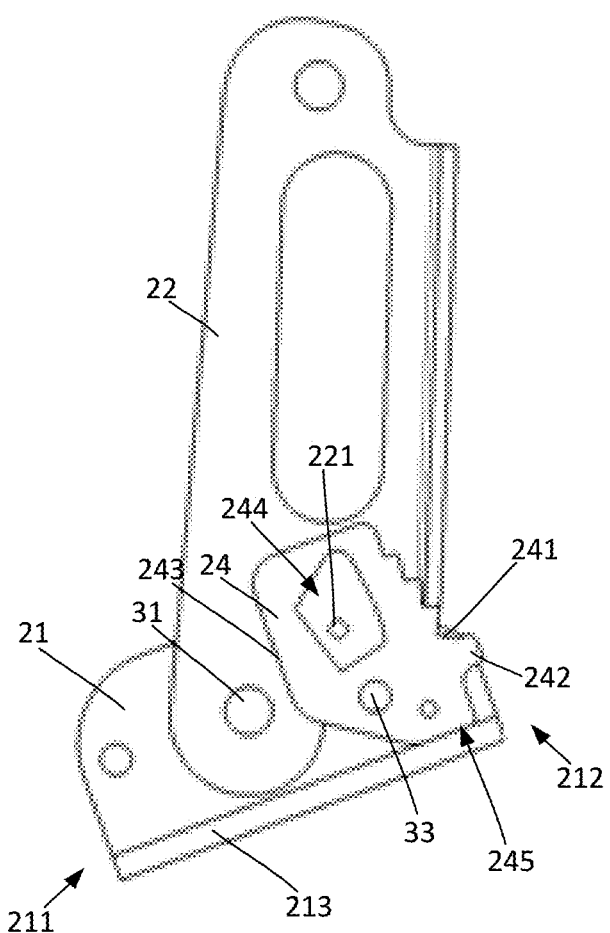
FIG. 11 is a schematic structural view of a clamping table when the self-reset adjusting mechanism according to the invention is in the first shiftposition.
Figure 12:
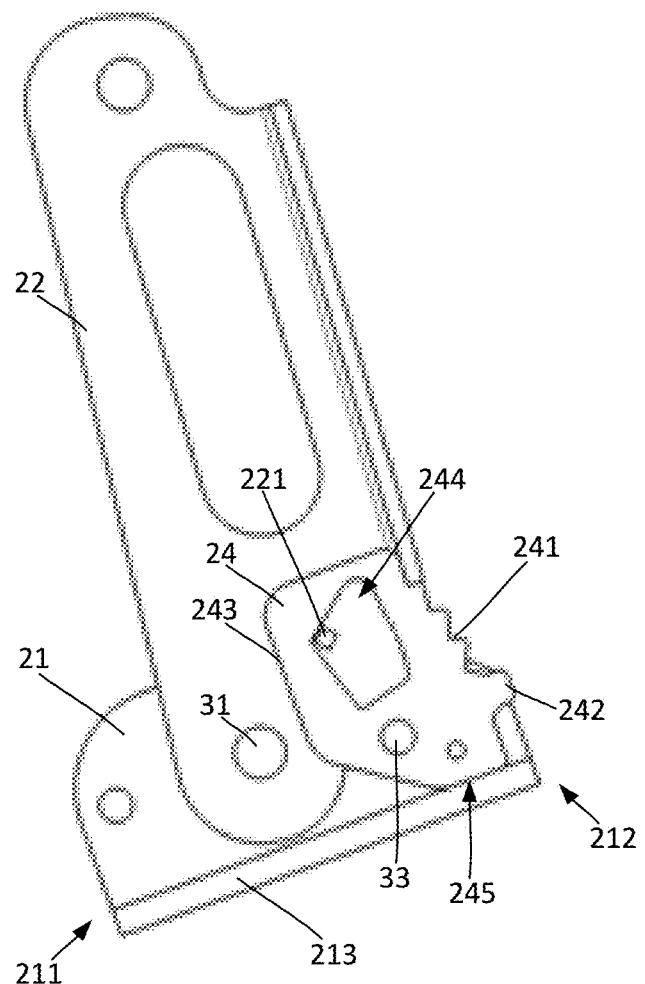
FIG. 12 is a schematic structural view showing that the self-reset adjusting mechanism according to the invention is on the highest clamping table.
Figure 13:
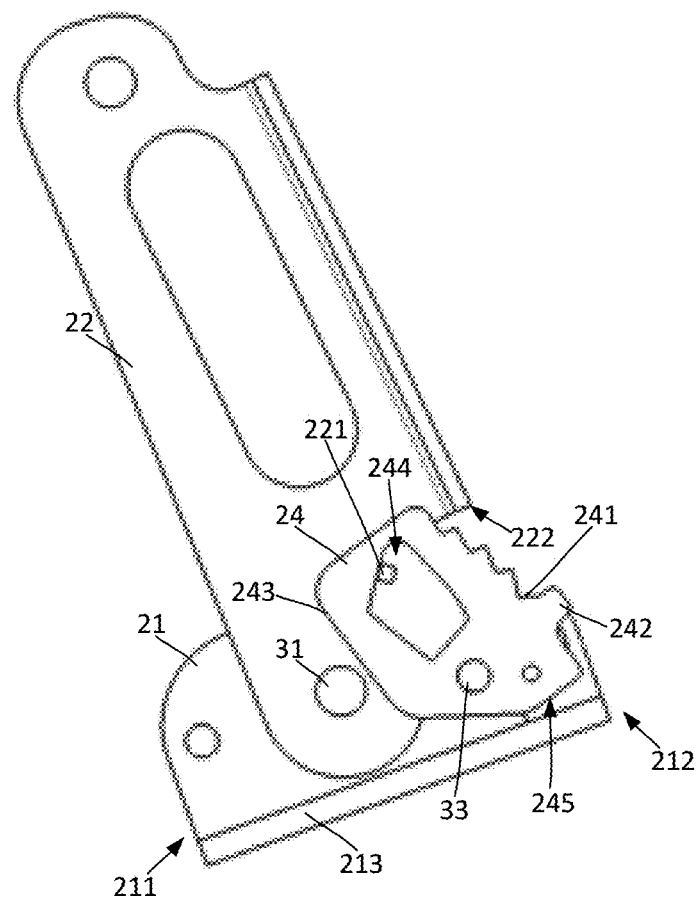
FIG. 13, FIG. 18, and FIG. 20 are schematic exploded structural views of a resetting process of the self-reset adjusting mechanism according to the invention.
Figure 14:
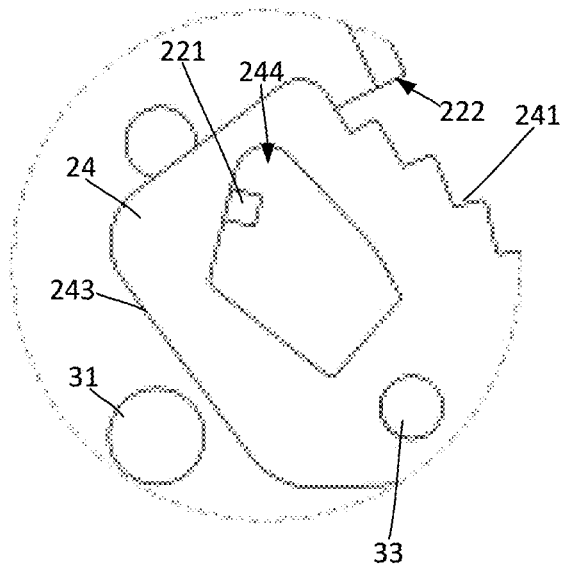
FIG. 14 is a partially enlarged schematic view of a junction between an adjusting member and a limiting member in the state shown in FIG. 13.
Figure 15:
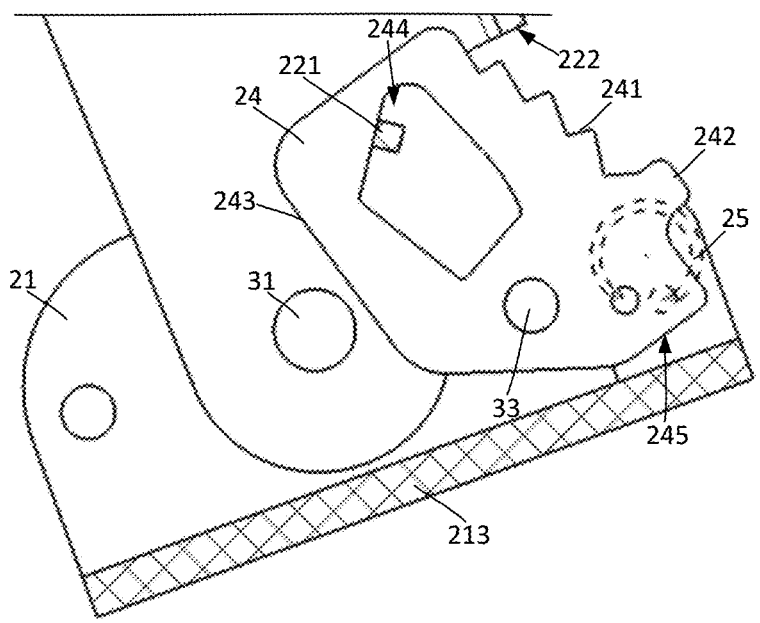
FIG. 15 is a schematic structural view of a second reset member in perspective in the state shown in FIG. 13.
Figure 18:
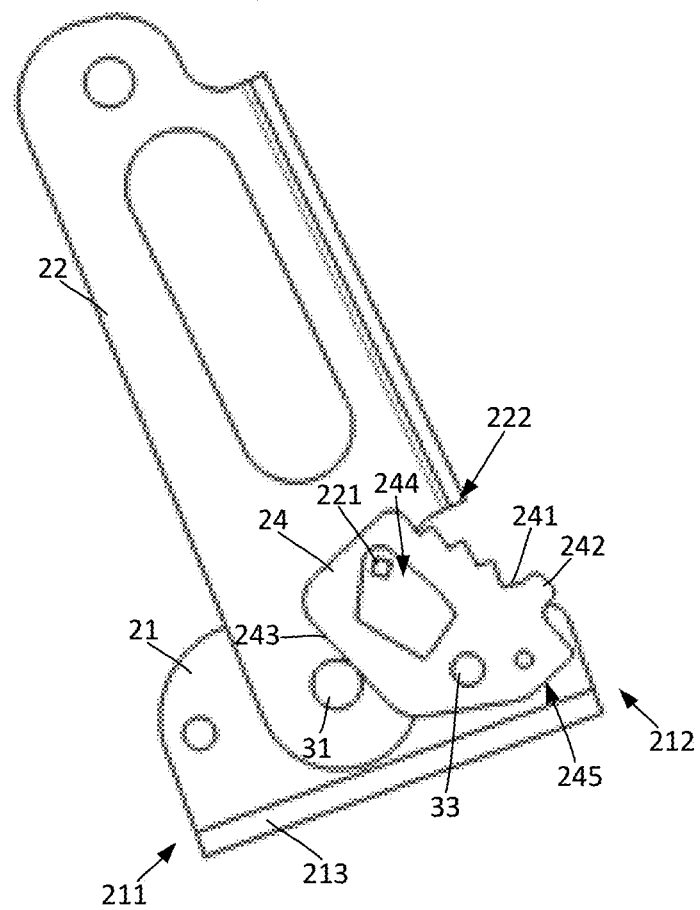
Figure 20:
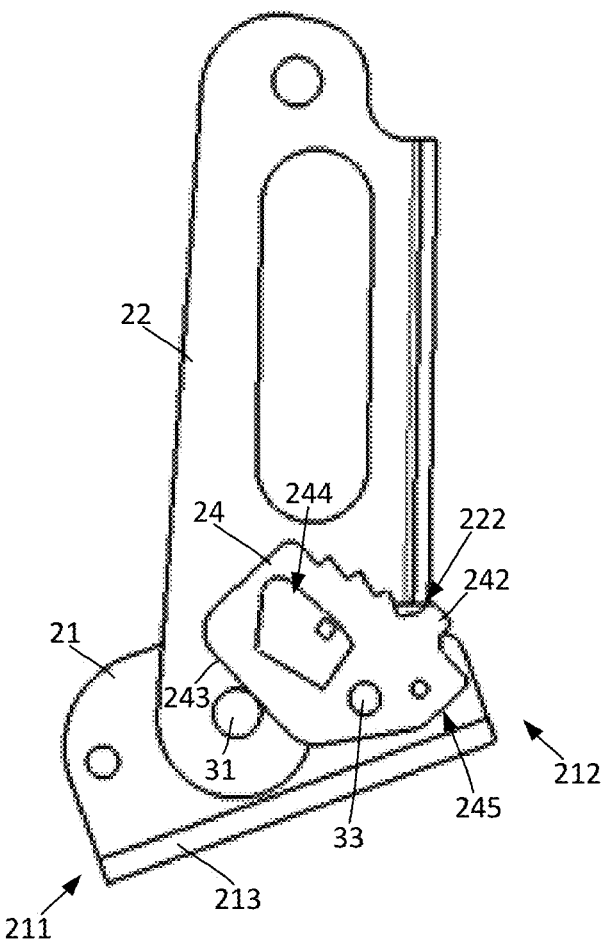

The rotation adjustment process of the self-resetting mechanism 20 is described below. As shown in FIG. 6, in the beginning, the adjusting member 22 is located on the lowest clamping table 241 of the limiting member 24, the clamping tables 241 of the limiting member 24 are disposed in a step shape, and the adjusting member 22 is rotated till it rotates around the mounting base 21. Referring to FIG. 8, the adjusting member 22 rotates from the lowest clamping table 241 to the clamping table 241 in the first shiftposition, the adjusting member 22 pushes the limiting member 24 to rotate together, and during rotation of the limiting member 24, the second reset member 25 produces an acting force in a direction opposite to a rotation direction of the limiting member 24. Referring to FIG. 9, when the adjusting member 22 rotates to the clamping table 241 in the first shiftposition, referring to FIG. 11, the limiting member 24 is reset under the action of the second reset member 25 to clamp the adjusting member 22 into the clamping table 241 in the first shiftposition. Rotation of the adjusting member 22 may be adjusted to a required shiftposition according to the above manner. Although the first reset member 23 always produces an acting force in a direction opposite to a rotation direction of the adjusting member 22, the adjusting member 22 cannot be reset during shiftposition adjustment due to mutual engagement between the adjusting member 22 and the clamping table 241 of the limiting member 24. Referring to FIG. 12, FIG. 13, and FIG. 18, when the adjusting member 22 is adjusted to the highest clamping table 241, the adjusting member 22 is continuously rotated to push the limiting member 24 to the limit position. Referring to FIG. 18, in this case, the second reset member 25 is deformed to produce an acting force in a direction the same as the rotation direction of the limiting member 24 to cause the limiting member 24 to be in the limit position. A gap exists between the clamping table 241 on the limiting member 24 in the limit position and the adjusting member 22, so that the clamping table 241 does not limit the adjusting member 22, in which case a rotating force exerted on the adjusting member 22 is released, and the adjusting member 22 may fall back to the original position under a force exerted by the first reset member 23. Referring to FIG. 20, during resetting, the adjusting member 22 may contact the limiting member 24 so as to exert a reset acting force on the limiting member 24, so that the second reset member 25 is restored and the limiting member 24 is reset to cause the self-reset adjusting mechanism to be reset to the state shown in FIG. 6.

Figure 19:
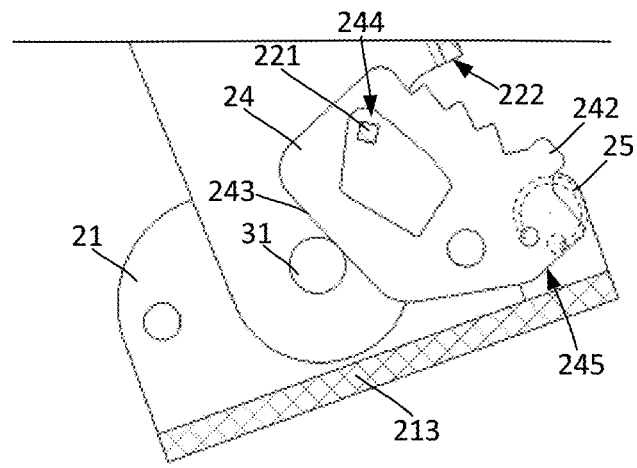
FIG. 19 is a schematic structural view of a second reset member in perspective in the state shown in FIG. 18.
Figure 21:
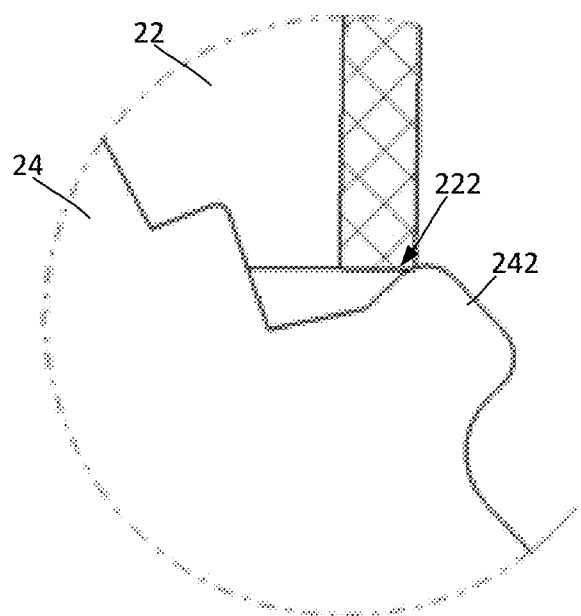
FIG. 21 is a partially enlarged schematic view of a junction between an adjusting member and a limiting member in the state shown in FIG. 20.

As a preferred implementation of the invention, as shown in FIG. 5 and FIG. 6, the limiting member 24 is provided with a flange 242 on the lowest clamping table 241, and the flange 242 is located on one side of the limiting member 24 corresponding to the adjusting member 22 and protrudes outwards. Referring to FIG. 19, in the state of the limiting member 24 shown in FIG. 19, a top end surface of the flange 242 protrudes out of an outer end surface of the clamping table 241. Referring to FIG. 20 and FIG. 21, when the limiting member 24 is in the limit position, the adjusting member 22 exerts the reset acting force on the limiting member 24 by abutting against the flange 242 during the resetting, thus completing the resetting of the adjusting member 22 and the limiting member 24. The flange 242 is disposed in such a position to prevent the adjusting member 22 from falling back, so that the adjusting member 22 can be clamped to the lowest clamping table 241 through the limiting of the flange 242.

As another preferred implementation of the invention, as shown in FIG. 1 to FIG. 4, the adjusting member 22 is rotatably mounted on the mounting base 21 through a first rotary shaft 31. The first rotary shaft 31 is disposed through the adjusting member 22 and the mounting base 21, so that the adjusting member 22 can achieve rotation adjustment through the first rotary shaft 31. Referring to FIG. 6, one side of the limiting member 24 close to the first rotary shaft 31 is provided with an abutting surface 243. Referring to FIG. 18, when the limiting member 24 is rotated to the abutting surface 243 to abut against the first rotary shaft 31, the limiting member 24 is in the limit position.

The limiting member 24 is rotatably mounted on the mounting base 21 through a second rotary shaft 33, and the second rotary shaft 33 is disposed through the limiting member 24 and the mounting base 21, so that the limiting member 24 can achieve rotation adjustment through the second rotary shaft 33. During mounting, the limiting member 24 is mounted close to the rear side 212 of the mounting base 21, and the adjusting member 22 is mounted in the middle of the mounting base 21, so that the adjusting member 22 is located in a front side of the limiting member 24. In this way, when the limiting member 24 rotates, it plays a role of limiting through the first rotary shaft 31. When the limiting member 24 rotates to abut against the first rotary shaft 31, the limiting member 24 is in the limit position due to the limiting of the first rotary shaft 31.

Figure 4:
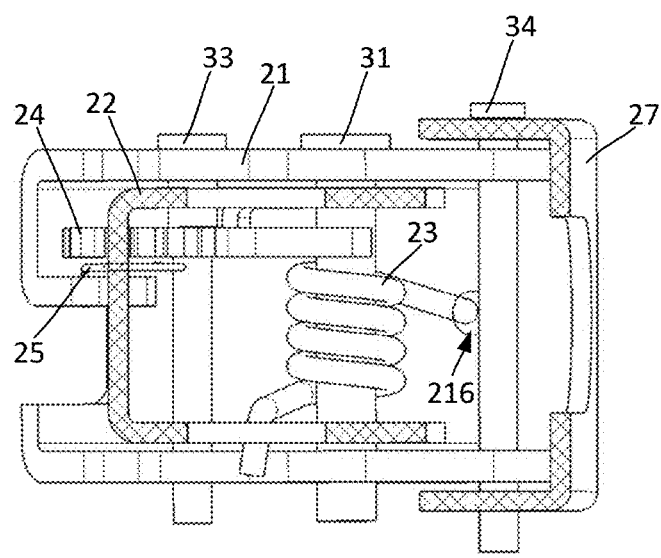
FIG. 4 is a sectional view of the self-reset adjusting mechanism according to the invention.

As yet another preferred implementation of the invention, as shown in FIG. 2 to FIG. 4, the first reset member 23 is a torsion spring. The torsion spring includes a first mounting end 231 and a second mounting send 232. The first mounting end 231 is fixed to the adjusting member 22, and the second mounting end 232 is fixed to the mounting base 21. So, when the adjusting member 22 is rotated, the torsion spring produces an elastic force in a direction opposite to the rotation direction of the adjusting member 22. Preferably, a side portion of the adjusting member 22 is provided with a mounting hole 232, the first mounting end 231 is inserted into the mounting hole 223 and fixed, the front side 211 of the mounting base 21 is provided with a bayonet 216, and the second mounting end 232 of the torsion spring is clamped into the bayonet 216 and fixed.

As still another implementation of the invention, as shown in FIG. 2 and FIG. 5, the second reset member 25 is a special-shaped torsion spring, and includes a first connection segment 251, an arc segment 252 connected to the first connection segment 251, and a second connection segment 253 connected to the arc segment 252, the first connection segment 251 and the second connection segment 253 are located on two sides of the arc segment 252 and are disposed in parallel with each other, and the arc segment 252 is arc-shaped. When the special-shaped torsion spring is mounted, the first connection segment 251 is fixed to the limiting member 24, and the second connection segment 253 is fixed to the mounting base 21. Preferably, referring to FIG. 7, the limiting member 24 is provided with a through hole 246, and the first connection segment 251 is inserted into the through hole 246 and fixed. The rear side 212 of the mounting base 21 is provided with a vertical plate 215. The vertical plate 215 is also provided with a through hole, and the second connection segment 253 is inserted into the through hole of the vertical plate 215 and fixed. After the first connection segment 251 and the second connection segment 253 of the special-shaped torsion spring are fixed, the arc segment 252 is stuck to a surface of the limiting member 24.

Figure 7:
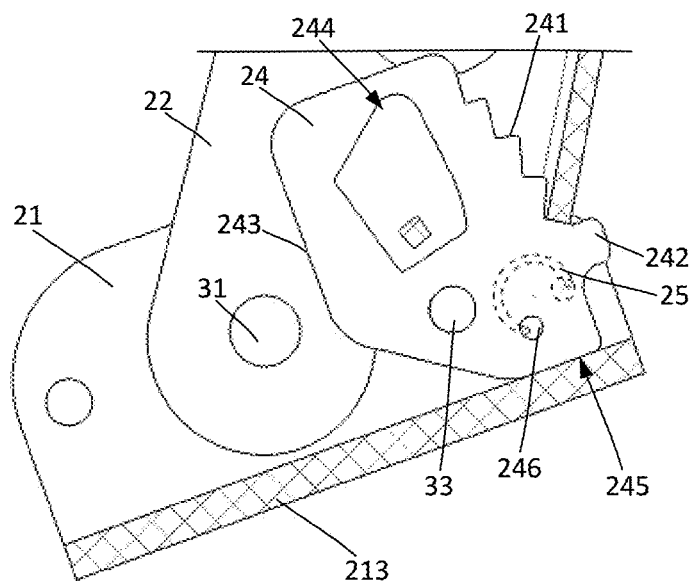
FIG. 7 is a schematic structural view of a second reset member in perspective in the state shown in FIG. 6.
Figure 10:
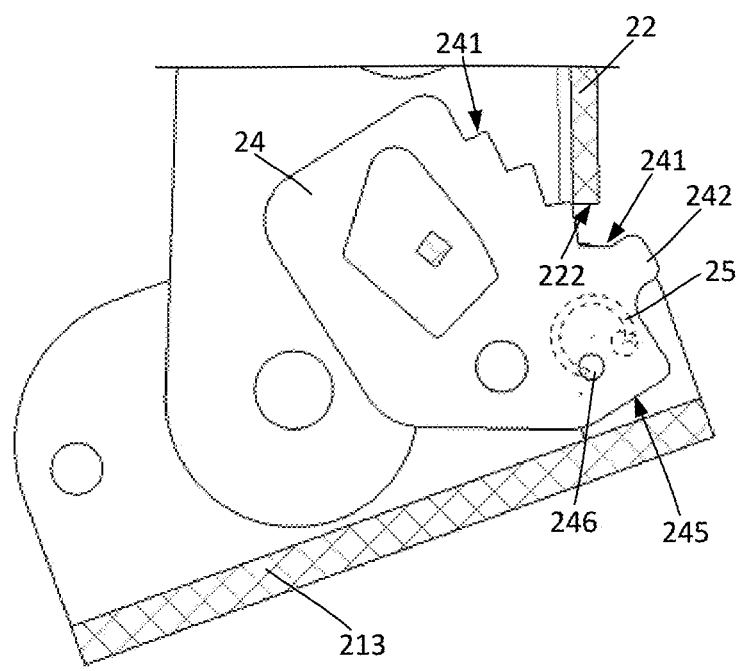
FIG. 10 is a schematic structural view of a second reset member in perspective in the state shown in FIG. 8.

Specifically, the working principle of the special-shaped torsion spring is as follows: as shown in FIG. 7, in an initial state, that is, the adjusting member 22 is clamped into the lowest clamping table 241, the first connection segment 251 and the second connection segment 253 are far apart, and in this case, the special-shaped torsion spring is in a natural state. As shown in FIG. 10, when the adjusting member 22 rotates to drive the limiting member 24 to rotate, the limiting member 24 rotates around the second rotary shaft 33, and the rotation direction is the counterclockwise direction in FIG. 10. The first connection segment 251 is approaching the second connection segment 253, and the arc segment 252 is deformed to produce an elastic force to restore to the original shape. When the adjusting member 22 rotates to the clamping table 241 in the first shiftposition, the limiting member 24 is rotated to restore to the original position under the elastic force of the arc segment 252, so that the clamping table 241 in the first shiftposition is engaged with the adjusting member 22. Referring to FIG. 12 to FIG. 15, when the adjusting member 22 is located on the highest clamping table 241 and continues counterclockwise rotating, the limiting member 24 also further rotates. Referring to FIG. 19, when the first connection segment 251 further approaches the second connection segment 253 and the first connection segment 251 approximately contacts the second connection segment 253, the arc segment 252 is propped up to form a circular shape. The arc segment 252 is deformed to its limit position to produce an acting force that supports the limiting member 24, that is, the arc segment 252 produces an acting force in a direction the same as the counterclockwise rotation direction of the limiting member 24 to cause the abutting surface 243 of the limiting member 24 to abut against the first rotary shaft 31, so that the plurality of clamping tables 241 do not limit the adjusting member 22. In this case, after the adjusting member 22 contacts an exerted rotating force, it may clockwise rotate under the action of the torsion spring. When the bottom of the adjusting member 22 contacts the flange 242 of the limiting member 24, a clockwise rotating force is exerted on the limiting member 24, so that the limiting member 24 clockwise rotates. The first connection segment 251 moves in a direction away from the second connection segment 253, so that the arc segment 252 restores the deformation and then exerts a clockwise force on the limiting member 24 to reset the limiting member 24. So, the adjusting member 22 and the limiting member 24 are restored to the state shown in FIG. 6.

Figure 16:
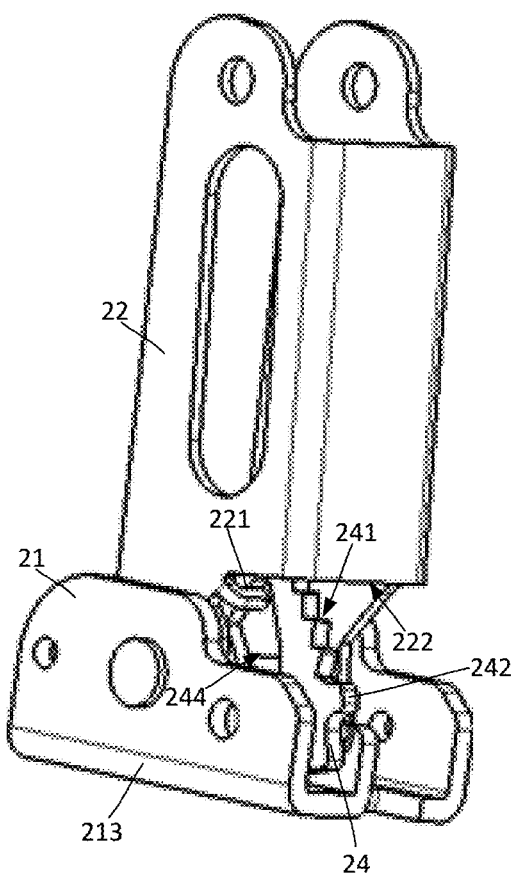
FIG. 16 is a schematic view of an overall structure in the state shown in FIG. 13.
Figure 17:
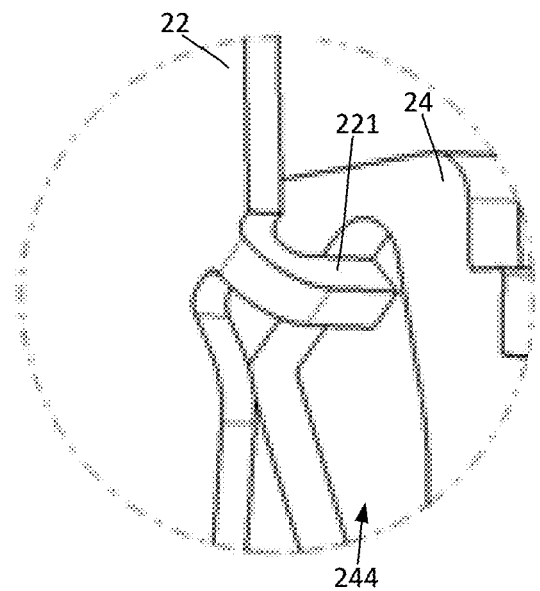
FIG. 17 is a partially enlarged schematic view of the positioning convex strip and the special-shaped opening in FIG. 16.

As a further preferred implementation of the invention, as shown in FIG. 6, FIG. 16, and FIG. 17, to prevent the adjusting member 22 from rotating too much to come off from one side of the limiting member 24, the limiting member 24 of the invention is provided with a special-shaped opening 244, and the adjusting member 22 is provided with a positioning convex strip 221 running through the special-shaped opening 244. As shown in FIG. 12, when the adjusting member 22 is located on the highest clamping table 241, the positioning convex strip 221 is fitted to an inner wall of the special-shaped opening 244 to limit the rotation of the adjusting member 22, that is, limit the relative rotation between the adjusting member 22 and the limiting member 24. Referring to FIG. 13, when the adjusting member 22 continues counterclockwise rotating, the positioning convex strip 221 is fitted to an inner wall of the special-shaped opening 244 to drive the limiting member 24 to rotate together. By setting the positioning convex strip 221 and the special-shaped opening 244, the adjusting member 22 and the limiting member 24 cannot be detached from each other.

Further, as shown in FIG. 2, the mounting base 21 includes a bottom plate 213. Referring to FIG. 6, one side of the limiting member 24 close to the bottom plate 213 is provided with a fitting surface 245 fitted to the bottom plate 213. In an initial state, that is, the adjusting member 22 is clamped to the lowest clamping table 241, the fitting surface 245 is fitted to the bottom plate 213 of the mounting base 21, so that the self-reset adjusting mechanism 20 is highly stable. Referring to FIG. 8, when the adjusting member 22 adjusts the shiftposition, the adjusting member 22 abuts against the limiting member 24 to cause the limiting member 24 to counterclockwise rotate, and the fitting surface 245 is away from the bottom plate 213. Referring to FIG. 9 and FIG. 10, when the bottom of the adjusting member 22 moves from a top end of a connecting side portion between the lowest clamping table 241 and the clamping table 241 in the first shiftposition above the clamping table 241 in the first shiftposition, referring to FIG. 11, the second reset member 24 resets the limiting member 24, and the fitting surface 245 is fitted to the bottom plate 213. Thus, one shiftposition adjustment is completed.

The mounting base 21 of the invention is provided with a pair of wing plates 214 on the bottom plate 213. The adjusting member 22 and the limiting member 24 are mounted through the pair of wing plates 214. Structural stability of the mounting of the adjusting member 22 and the limiting member 24 is improved using the pair of wing plates 214 disposed opposite to each other. preferably, the mounting base 21 is of a U-shaped structure. certainly, the mounting base 21 of the invention may also be in other shapes, such as a block shape.

As a further preferred implementation of the invention, as shown in FIG. 2, a clamping surface 222 for clamping to the corresponding clamping table 241 is formed at the bottom of the adjusting member 22. Referring to FIG. 6, the clamping interface 222 of the adjusting member 22 is clamped to the clamping table 241 of the limiting member 24, and the position of the adjusting member 22 is limited by the clamping table 241 supporting the clamping surface 222. The clamping surface 222 is disposed at the bottom of the adjusting member 22. Preferably, the adjusting member 22 includes an adjusting plate with the clamping surface 222 formed at the bottom, a connecting wing plate for connection is connected to two sides of the adjusting plate, the bottom and the top of the connecting wing plate both protrude out of the bottom and the top of the adjusting plate to form a connecting end portion, and the first rotary shaft 31 passes through the connecting end portion and the mounting base 21 at the bottom to achieve that the adjusting member 22 is rotatably mounted on the mounting base 21. The connecting end portion at the top of the adjusting member 22 is provided with a connection shaft 32, and two end portions of the connection shaft 32 each are connected to a lug plate 26. Referring to FIG. 1, the adjusting member 22 and the two lug plates 26 are connected through the connection shaft 32, the two lug plates 26 are disposed on two sides of the top of the adjusting member 22, and the self-reset adjusting mechanism 20 of the invention is connected to the headrest through the lug plates 26. The mounting base 21 of the self-reset adjusting mechanism 20 of the invention is configured to mount the headrest to the automobile seat.

As shown in FIG. 2 and FIG. 3, the self-reset adjusting mechanism 20 further includes a transmission member 27 disposed between the two lug plates 26 and disposed opposite to the adjusting member 22, and the top of the transmission member 27 is fixedly connected to the two lug plates 26. Preferably, by fastening the lug plates 26 and the top of the transmission member 27 through a rivet 35, the bottom of the transmission member 27 is rotatably mounted on the mounting base 21, and the adjusting member 22 is driven to rotate through the transmission member 27. The transmission member 27, as an active arm, transfers the acting force on the headrest to the adjusting member 22. Preferably, the bottom of the transmission member 27 is rotatably mounted on the mounting base 21 through a third rotary shaft 34.

The invention is described above in detail with reference to the accompanying drawings and embodiments. A person of ordinary skill in the art can make various changes to the invention according to the above description. Therefore, some details in the embodiments should not constitute limitations to the invention. In the invention, the scope defined by the appended claims is taken as the protection scope of the invention.

What is claimed is:

1. A self-reset adjusting mechanism, comprising:
a mounting base configured to be connected to a car seat;
an adjusting member rotatably mounted on the mounting base and configured to be connected to a car headrest;
a first reset member deformably mounted between the adjusting member and the mounting base to provide a first recovery force to the adjusting member when moved away from the mounting base;
a limiting member driven by the adjusting member to be rotatably mounted on the mounting base and having clamping tables formed on a side face thereof to be selectively engaged with the adjusting member so that the adjusting member has a lowest position and a highest position relative to the limiting member; and
a second reset member deformably mounted between the limiting member and the mounting base to provide a second recovery force to the limiting member when moved away from the mounting base and a force causing the limiting member to be in a limit position when the adjusting member is located at the highest position relative to the limiting member,
wherein, after the adjusting member is back to the lowest position, the limiting member is moved under influence of the second recovery force.

2. The self-reset adjusting mechanism according to claim 1, wherein the limiting member is provided with a flange securely formed on the limiting member to be selectively engageable with the adjusting member to initiate movement of the limiting member under the influence of the second recovery force.

3. The self-reset adjusting mechanism according to claim 2, wherein the adjusting member is rotatably mounted on the mounting base through a first rotary shaft; and
one side of the limiting member close to the first rotary shaft is provided with an abutting surface, and when the limiting member is rotated to the abutting surface to abut against the first rotary shaft, the limiting member is in the limit position.

4. The self-reset adjusting mechanism according to claim 1, wherein the first reset member is a torsion spring, one end of the torsion spring is fixed to the adjusting member, and the other end is fixed to the mounting base.

5. The self-reset adjusting mechanism according to claim 1, wherein the second reset member is a special-shaped torsion spring, and comprises a first connection segment, an arc segment connected to the first connection segment, and a second connection segment connected to the arc segment, the first connection segment and the second connection segment are located on two sides of the arc segment and are disposed in parallel with each other, and the arc segment is arc-shaped; and
the first connection segment is fixed to the limiting member, and the second connection segment is fixed to the mounting base.

6. The self-reset adjusting mechanism according to claim 1, wherein the limiting member is provided with an opening;
the adjusting member is provided with a positioning convex strip extending through the opening to allow the positioning convex strip to abut against an inner wall of the opening to limit the rotation of the adjusting member when the adjusting member is at the highest position.

7. The self-reset adjusting mechanism according to claim 1, wherein the mounting base comprises a bottom plate; and one side of the limiting member close to the bottom plate is provided with a fitting surface fitted to the bottom plate.

8. The self-reset adjusting mechanism according to claim 1, wherein a clamping surface for clamping to the corresponding clamping table is formed at the bottom of the adjusting member.

9. The self-reset adjusting mechanism according to claim 1, wherein one end of the adjusting member away from the mounting base is provided with a connection shaft, and two end portions of the connection shaft each are connected to a lug plate.

10. The self-reset adjusting mechanism according to claim 9, further comprising a transmission member disposed between the two lug plates and disposed opposite to the adjusting member, the top of the transmission member is fixedly connected to the two lug plates, the bottom is rotatably mounted on the mounting base, and the adjusting member is driven to rotate through the transmission member.

11. A self-reset adjusting mechanism, comprising:
a mounting base configured to be connected to a car seat and comprising a bottom plate;
an adjusting member rotatably mounted on the mounting base and configured to be connected to a car headrest;
a first reset member deformably mounted between the adjusting member and the mounting base to provide a first recovery force to the adjusting member when moved away from the mounting base;
a limiting member driven by the adjusting member to be rotatably mounted on the mounting base and having clamping tables formed on a side face thereof to be selectively engaged with the adjusting member so that the adjusting member has a lowest position and a highest position relative to the limiting member, wherein one side of the limiting member close to the bottom plate is provided with a fitting surface fitted to the bottom plate; and a second reset member deformably mounted between the limiting member and the mounting base to provide a second recovery force to the limiting member when moved away from the mounting base and a force causing the limiting member to be in a limit position when the adjusting member is located at the highest position relative to the limiting member, wherein, after the adjusting member is back to the lowest position, the limiting member is moved under influence of the second recovery force.

12. The self-reset adjusting mechanism according to claim 11, wherein the first reset member is a torsion spring, one end of the torsion spring is fixed to the adjusting member, and the other end is fixed to the mounting base.

13. The self-reset adjusting mechanism according to claim 11, wherein the second reset member is a special-shaped torsion spring, and comprises a first connection segment, an arc segment connected to the first connection segment, and a second connection segment connected to the arc segment, the first connection segment and the second connection segment are located on two sides of the arc segment and are disposed in parallel with each other, and the arc segment is arc-shaped; and the first connection segment is fixed to the limiting member, and the second connection segment is fixed to the mounting base.

14. The self-reset adjusting mechanism according to claim 11, wherein the limiting member is provided with an opening;

the adjusting member is provided with a positioning convex strip extending through the opening to allow the positioning convex strip to abut against an inner wall of the opening to limit the rotation of the adjusting member when the adjusting member is at the highest position.

* * * * *